United States Patent [19]

Kubota

[11] Patent Number: 5,702,859
[45] Date of Patent: Dec. 30, 1997

[54] ELECTROPHOTOGRAPHIC TONER AND PROCESS FOR THE PRODUCTION THEREOF

[75] Inventor: Hideyuki Kubota, Shizuoka-ken, Japan

[73] Assignee: Tomoegawa Paper Co., Ltd., Tokyo, Japan

[21] Appl. No.: 647,744

[22] Filed: May 15, 1996

[30] Foreign Application Priority Data

| May 16, 1995 | [JP] | Japan | 7-141165 |
| Dec. 22, 1995 | [JP] | Japan | 7-350509 |
| Mar. 26, 1996 | [JP] | Japan | 8-070537 |
| Apr. 18, 1996 | [JP] | Japan | 8-120985 |

[51] Int. Cl.⁶ .................................... G03G 9/097
[52] U.S. Cl. ............................................. 430/110
[58] Field of Search ................................. 430/110

[56] References Cited

U.S. PATENT DOCUMENTS

| 4,882,258 | 11/1989 | Ikeuchi et al. | 430/110 |
| 4,943,506 | 7/1990 | Demizu et al. | 430/110 |
| 5,368,972 | 11/1994 | Yamashita et al. | 430/109 |
| 5,529,873 | 6/1996 | Chiba et al. | 430/110 |
| 5,547,799 | 8/1996 | Yoshie et al. | 430/110 |

*Primary Examiner*—Roland Martin
*Attorney, Agent, or Firm*—Wenderoth, Lind & Ponack

[57] ABSTRACT

An electrophotographic toner which can be fixed at a low fixing temperature, causes no practical problem on offsetting-free properties and has excellent fixing strength to a transfer sheet, and a process for the production thereof, the toner containing a binder resin and a colorant as main components and further containing a Fischer-Tropsch wax formed from natural gas and/or a Fischer-Tropsch wax formed from coal and having a melt viscosity, measured at 110° C., of $1 \times 10^5$ to $1 \times 10^6$ poise, the process comprising solution-polymrerizing, suspension-polymerizing or emulsion-polymerizing a vinyl-containing monomer in which the Fischer-Tropsch wax formed from natural gas and/or a Fischer-Tropsch wax formed from coal are/is dissolved in advance, to prepare the binder resin.

11 Claims, No Drawings

ELECTROPHOTOGRAPHIC TONER AND PROCESS FOR THE PRODUCTION THEREOF

FIELD OF THE INVENTION

The present invention relates to an electrophotographic toner and a process for the production thereof. More specifically, the present invention relates to an electrophotographic toner suitable for use with a copying machine and a printer for which a heat-roll fixing method is adapted, and a process for the production thereof.

PRIOR ART OF THE INVENTION

In recent years, with the spreading use of a copying machine and a printer for which an electrophotographic method is adapted, it is desired that the copying machine and the printer should comply with a decrease in energy (electric power consumption) mainly for the purpose of general use of them at home and attaining multi-functions of these machines. It is also desired to comply with a fast performance for spreading the use of them to a so-called gray zone in a boundary of printers and copying machines. Further, it is desired to simplify a heat-fixing roll, e.g., to decrease the roll pressure, in order to decrease the costs of them. Further, with the availability of quality copying machines, copying machines having the function of double-surface copying and an automatic document feeder are widely used. An electrophotographic toner for use with a copying machine or a printer is required to have the following properties. That is, the electrophotographic toner is required to have a low fixing temperature and excellent resistance to offsetting. Further, it is also required to have fixing strength to a transfer sheet sufficient for the prevention of scumming at the time of double- surface copying and scumming of an automatic document feeder.

For complying with the above requirements, it has been hitherto proposed to improve a toner in the molecular weight and the molecular weight distribution of the binder resin.

Specifically, it has been attempted to decrease the molecular weight of a binder resin for decreasing the fixing temperature. The purpose of decreasing the melting point of a toner has been achieved by using a binder resin having a low molecular weight, while the melt viscosity of the toner decreases at the same time. As a result, there is caused another problem in that a phenomenon of toner adhering to a heat-fixing roll, a so-called offsetting phenomenon, takes place.

It has been attempted to overcome the above offsetting phenomenon by a method in which the low molecular weight region and the high molecular weight region of the molecular weight of the binder resin are broadened, or by a method in which the binder resin in the high molecular weight region is crosslinked. For imparting a toner with sufficient low-temperature fixing properties by these methods, however, it is required to improve the "anchor" effect of the toner to a transfer sheet, and it is unavoidable to decrease the glass transition temperature (Tg) of the binder resin. However, when the glass transition temperature of the binder resin is decreased, the melting initiation temperature of the toner decreases, and the toner starts to melt around room temperature, which causes another problem in that the shelf life of the toner is impaired. Further, when the amount of the binder resin in the low molecular weight region is increased, the toner itself is fragile and is easily crushed by mechanical friction, etc., which leads to new defects in that a transfer sheet is scummed at the time of double-surface copying and that the automatic document feeder is scummed.

It is conventional practice to incorporate a binder resin containing 25 to 50% by weight of a polymer having a molecular weight, measured by GPC, of less than 1,000,000, e.g., a styrene/acrylic resin, into an electrophotographic toner. That is because when a resin containing a polymer having a molecular weight of 1,000,000 or more is produced, the resin strongly exhibits elasticity to degrade its handling properties. There is another problem in that the above polymer having a high molecular weight has an adverse effect on the low-temperature fixing properties when incorporated into a toner. For these reasons, the content of the polymer having a high molecular weight is required to be approximately 25 to 50% by weight in view of a balance between the low-temperature fixing properties and the resistance to offsetting. As explained above, a resin containing a polymer having a high molecular weight inevitably has a high melt viscosity. When a mixture of a Fischer-Tropsch wax and the above binder resin is kneaded, the dispersibility of the Fischer-Tropsch wax is unavoidably poor.

For preventing the offsetting phenomenon, there is another method in which a releasing agent such as a polypropylene having a low molecular weight is incorporated. However, polypropylenes which are commercially available so far have a melting point of 135° to 145° C. When a toner containing the above polypropylene having a low molecular weight is fixed at a low temperature, the effect of preventing the offsetting phenomenon is insufficient and an offsetting takes place. Further, another problem is that no sufficient fixing strength to a transfer sheet can be obtained since the toner has an increased melting point.

A polypropylene wax (melting point 135°–145° C.) has excellent offsetting resistance at a high temperature, while it is not suitable for fixing at a low temperature due to its high melting point. For decreasing the melting initiation temperature of a toner, therefore, it has been proposed to incorporate a low-melting-point wax which has a low melting point and exhibits a sharp fusing behavior. Petroleum-based paraffin waxes and low-melting-point microcrystalline waxes containing isoparaffin, naphthene or an aromatic compound are known as waxes having low melting points. However, the problem of these waxes is that they cause a problem on the shelf life of a toner due to their low molecular weights. Further, since the above petroleum-based waxes and microcrystalline waxes show a high rate of penetration, as high as 5 or more, and they therefore decrease the powder flowability when used in a fine powder such as a toner and are liable to cause an undesirable effect on image characteristics.

Further, JP-A-61-273554 discloses that a Fischer-Tropsch wax formed from coal is incorporated into a toner. The toner containing the Fischer-Tropsch wax is effective for preventing the offsetting. However, the toner has a problem when stored in a high-temperature atmosphere.

SUMMARY OF THE INVENTION

It is an object of the present invention to provide an electrophotographic toner which can be fixed at a low fixing temperature, causes no practical problem on offsetting-free properties and has excellent fixing strength to a transfer sheet, and a process for the production thereof.

According to the present invention 1, there is provided an electrophotographic toner containing a binder resin and a colorant as main components, the toner further containing a Fischer-Tropsch wax formed from natural gas.

According to the present invention 2, there is provided an electrophotographic toner containing a binder resin and a colorant as main components, the toner further containing a Fischer-Tropsch wax formed from natural gas and/or a Fischer-Tropsch wax formed from coal and having a melt viscosity, measured at 110° C., of $1 \times 10^5$ to $1 \times 10^6$ poise.

According to the present invention 3, there is provided an electrophotographic toner containing a binder resin and a colorant as main components, the toner containing a Fischer-Tropsch wax formed from natural gas and/or a Fischer-Tropsch wax formed from coal, the binder resin being a styrene/(meth)acrylate copolymer, the toner showing two maximal values when measured by GPC, one maximal value being at least $8 \times 10^5$, the other being in the range of from 3,000 to 10,000.

According to the present invention 4, there is provided an electrophotographic toner containing a binder resin and a colorant as main components, the binder resin containing a vinyl-containing copolymer formed by polymerization in the presence of a-Fischer-Tropsch wax formed from natural gas and/or a Fischer-Tropsch wax formed from coal.

According to the present invention 5, there is provided a process for the production of an electrophotographic toner containing a binder resin and a colorant as main components, which comprises solution-polymerization, suspension-polymerizing or emulsion-polymerizing a vinyl-containing monomer in which a Fischer-Tropsch wax formed from natural gas and/or a Fischer-Tropsch wax formed from coal are/is dissolved in advance, to prepare the binder resin.

DETAILED DESCRIPTION OF THE INVENTION

The present invention 1 is directed to an electrophotographic toner containing a Fischer-Tropsch wax formed from natural gas.

The Fischer-Tropsch wax formed from natural gas, used in the present invention, is produced from natural gas as a raw material by a Fischer-Tropsch method, and it is a hydrocarbon in the form of a wax, synthesized by catalytically hydrogenating carbon monoxide. Structurally, it is a linear paraffin-based wax having a small amount of methyl branches.

The above Fischer-Tropsch wax formed from natural gas is commercially available in the trade names of FT-100, FT-0050, FT-0070, FT-0165, FT-1155, FT-60S, etc. (supplied by Shell MDS (Malaysia) Sdn. Bhd.

The Fischer-Tropsch wax formed from natural gas preferably has a melting point of 85° to 100° C. when measured with a differential scanning calorimeter (DSC). A Fischer-Tropsch wax formed from natural gas, having a melting point lower than the above lower limit, is liable to cause the shelf life problem of the toner, and is liable to degrade the flowability of the toner. When the melting point of the Fischer-Tropsch wax formed from natural gas is higher than the above upper limit, the Fischer-Tropsch wax has almost no effect on decreasing the melt initiation temperature, and it is therefore difficult to impart the toner with low-temperature fixing properties.

Further, the Fischer-Tropsch wax formed from natural gas preferably shows a penetration rate of 2 or less when measured at 25° C. according to JIS K-2235. When the penetration rate is greater than 2, a toner containing the Fischer-Tropsch wax formed from natural gas is liable to show poor flowability, and the toner is liable to have a problem on the shelf life and tribocharge.

The content of the Fischer-Tropsch wax formed from natural gas in the electrophotographic toner is preferably 1 to 20% by weight based on the total amount of the toner. When the above content is less than 1% by weight, the releasability of the toner is not sufficient and the high-temperature offsetting resistance is liable to be insufficient. Further, the effect on decreasing the melt initiation temperature of the toner is small, and when the toner is fixed at a low temperature, it is therefore difficult to obtain sufficient fixing strength to a transfer sheet. When the above content is greater than 20% by weight, the Fischer-Tropsch wax formed from natural gas is liable to be poorly dispersed due to the poor compatibility with the binder resin, and undesirably, the toner is liable to show poor high-temperature offsetting resistance due to the dissociation of the wax alone at a pulverization time.

The materials other than the Fischer-Tropsch wax formed from natural gas, i.e., the binder resin and the colorant, used in the present invention 1 will be explained hereinafter.

The binder resin used in the present invention 1 includes a polystyrene resin, a polyacrylic ester resin, a styrene-acrylate copolymer resin, a styrene-methacrylate copolymer resin, polyvinyl chloride, polyvinyl acetate, polyvinylidene chloride, a phenolic resin, an epoxy resin and a polyester resin.

The colorant used in the present invention 1 includes carbon black, nigrosine dye, Aniline Blue, Chalco Oil Blue, Chromium Yellow, Ultramarine Blue, du Pont Oil Red, Quinoline Yellow, Methylene Blue-Choloride, Phthalocyanine Blue, Malachite Green Oxalate and mixtures of these. The colorant is incorporated in an amount sufficient for forming a visible image having a sufficient density. The amount of the colorant per 100 parts by weight of the binder resin is generally 1 to 20 parts by weight.

The electrophotographic toner of the present invention is formed of particles obtained by dispersing the Fischer-Tropsch wax, the binder resin, the colorant and optionally other toner components such as a charge controlling agent, a releasing agent and a magnetic material. The electrophotographic toner has an average particle diameter in the range of from 5 to 20 µm. Further, the electrophotographic toner of the present invention may further contain a flowability improving agent formed of silica fine particles, and in this case, the flowability improving agent is mixed with the above particles.

The electrophotographic toner of the present invention may be mixed with a carrier formed of a resin fine powder containing an iron powder, ferrite, granulated magnetite and a magnetic powder for use as a two-component developer, or it may be used as a one-component developer without mixing it with the carrier.

The electrophotographic toner of the present invention 2 has a melt viscosity, measured at 110° C., of $1 \times 10^5$ to $1 \times 10^6$ poise. The reason therefor is as follows.

The present invention 2 uses a Fischer-Tropsch wax formed from natural gas and/or a Fischer-Tropsch wax formed from coal.

The Fischer-Tropsch wax formed from coal, which may be used in combination of the Fischer-Tropsch wax formed from natural gas in the present invention 2, is a product produced from coal by a Fischer-Tropsch method. The Fischer-Tropsch wax formed from coal is a wax formed as a byproduct when synthetic petroleum is produced from coal by a hydrocarbon synthesis method. For example, the Fischer-Tropsch wax formed from coal is commercially available in the trade name of "Sazol Wax" of SASOL, South African Coal Oil & Gas Corp., Ltd. Structurally, the Fischer-Tropsch wax formed from coal is a linear paraffin-based wax having a small amount of methyl branches. It has a melting point of 80° to 110° C., preferably 85° to 110° C., when measured with a differential scanning calorimeter (DSC). A Fischer-Tropsch wax formed from coal, having a melting point lower than the above lower limit, is liable to cause the shelf life problem of the toner, and is liable to degrade the flowability of the toner. The Fischer-Tropsch wax formed from natural gas and the Fischer-Tropsch wax formed from coal have longer linear structures than general paraffin wax, and have a smaller amount of side chains than a microwax.

Further, the Fischer-Tropsch wax formed from natural gas and the Fischer-Tropsch wax formed from coal preferably show a penetration rate of 2 or less when measured at 25° C. according to JIS K-2235. When the penetration rate is greater than 2, a toner containing the Fischer-Tropsch wax formed from natural gas and/or the Fischer-Tropsch wax formed from coal is liable to show poor flowability, and the toner is liable to have a problem on the shelf life and the tribocharge with carrier particles. The Fischer-Tropsch wax formed from natural gas and the Fischer-Tropsch wax formed from coal used in the present invention 2 have lower melting points than a polypropylene wax and are therefore excellent in low-temperature fixing properties. Further, each of the Fischer-Tropsch wax formed from natural gas and the Fischer-Tropsch wax formed from coal have a very small content of components having low melting points as compared with existing petroleum-based wax and coal-based paraffin wax and they are therefore excellent in shelf life. Further, since they have a low rate of penetration, as low as 2 or less, they neither degrade the flowability of the toner nor cause any problem on the tribocharge.

The Fischer-Tropsch wax formed from natural gas and the Fischer-Tropsch wax formed from coal used in the present invention 2 may be poor in dispersibility in a conventional binder resin used together with a polypropylene wax, since they have low melting points. The reason therefor is as follows. The conventional binder resin has melting viscosity characteristics compatible with the melting point of a polypropylene wax, and the polypropylene wax exhibits good dispersibility when a mixture for a toner is kneaded at a kneading temperature suitable for the polypropylene wax.

When a binder resin having conventional melting viscosity characteristics is used together with the Fischer-Tropsch wax used in the present invention 2, it is not sufficient to decrease the kneading temperature in order to obtain the dispersibility of the Fischer-Tropsch wax equivalent to that of a polypropylene wax due to a large difference in melting viscosity between the binder resin and the Fischer-Tropsch wax. Therefore, the offsetting-free temperature on the low temperature side is high, and there is caused a problem in that the fixing strength in low-temperature fixing is low. Further, when the kneading temperature is too low, a polymer having a higher molecular weight as part of the binder resin is sectioned, and there is therefore caused a problem in that the toner is degraded in offsetting resistance on the high-temperature side.

The present inventor has therefore decreased the molecular weight of a polymer having a lower molecular weight as part of the binder resin and has increased the molecular weight of a polymer having a higher molecular weight as part of the binder resin, in order to decrease the melt initiation temperature as the binder resin to 110° C. or lower, whereby the melt viscosity of the binder resin can be decreased to $1 \times 10^6$ poise or lower at 110° C. As a result, an electrophotographic toner containing the above binder resin can have a melt viscosity of $1 \times 10^5$ to $1 \times 10^6$ poise at 110° C.

The difference of the above binder resin from the Fischer-Tropsch wax in melt viscosity is so decreased that a mixture for the toner can be kneaded at a lower temperature than a conventionally employed temperature. By adjusting the melt viscosity of the electrophotographic toner at 110° C. to $1 \times 10^5$ to $1 \times 10^6$ poise as described above, the dispersibility of the Fischer-Tropsch wax in the binder resin is improved, the offsetting-free temperature range can be shifted to a low-temperature side, the fixing strength at a low temperature is increased, and the offsetting resistance at a high temperature is improved.

When the melt viscosity of the electrophotographic toner is lower than $1 \times 10^5$ poise, the shelf life is degraded and an offsetting takes place at a high temperature. When the melt viscosity of the electrophotographic toner is higher than $1 \times 10^6$ poise, the kneading at a low temperature is difficult, and the Fischer-Tropsch wax is therefore poorly dispersed. As a result, the electrophotographic toner shows poor flowability and causes an offsetting at a high temperature.

The "melt initiation temperature" and the "melt viscosity" in the present specification are measured with a flow tester (supplied by Shimadzu Corporation) with a 1.0×1.0 (mm) die under a load of 20 kgF at a preliminary heating temperature of 60° to 80° C. at a temperature elevation rate of 6° C./minute.

The "melting point" by DSC in the present specification refers to a temperature of a peak quantity of absorbed heat. It is measured with SSC-5200 (supplied by Seiko Instruments Inc.) by carrying out the process of temperature-increasing a sample at a rate of 10° C./minute between 20° C. and 150° C. and rapidly cooling the sample from 150° C. to 20° C. twice and measuring a quantity of absorbed heat in the second time.

The present invention 3 is directed to an electrophotographic toner containing a binder resin and a colorant as main components, the toner containing a Fischer-Tropsch wax formed from natural gas and/or a Fischer-Tropsch wax formed from coal, the binder resin being a styrene/(meth) acrylate copolymer, the toner showing two maximal values when measured by GPC (gel permeation chromatography), one maximal value being at least $8 \times 10^5$, the other being in the range of from 3,000 to 10,000.

When the binder resin used in the present invention 3 is measured for a molecular weight by GPC, one maximal value of the molecular weight is in the range of from 3,000 to 10,000. When the one maximal value of the molecular weight is less than 3,000, the resin strength is low, and the resin is fragile and easily crushed. When the one maximal value of the molecular weight is greater than 10,000, the toner has a high melt initiation temperature and shows poor low-temperature fixing properties. The other maximal value is at least $8 \times 10^5$. When the binder resin contains a resin having a large maximal value, as large as at least $8 \times 10^5$, as compared with a conventional value, the content of a polymer having a higher molecular weight in the binder resin can be decreased. As a result, the binder resin and the Fischer-Tropsch wax can be kneaded at a low temperature, and the toner can be imparted with improved low-temperature fixing properties.

The content of the polymer having a higher molecular weight in which the maximal value of the molecular weight is at least $8 \times 10^5$ is preferably 20% by weight or less based on the total weight of the toner. When the content of the polymer having a higher molecular weight is adjusted to 20% by weight or less, the difference between the melt viscosity of the binder resin and the melt viscosity of the Fischer-Tropsch wax is small, and the Fischer-Tropsch wax can be fully dispersed in the binder resin.

Since the binder resin is one of the main components of the toner, the adjustment of the molecular weight of the binder resin has a direct influence on the molecular weight of the toner. Therefore, when the molecular weight of the binder resin is adjusted to the above range, one maximal value of the molecular weight of the toner can be adjusted to at least $8 \times 10^5$, and the other maximal value can be adjusted to the range of from 3,000 to 10,000. No conventional electrophotographic toners contain a binder resin having a molecular weight of which the maximal value is at least $8 \times 10^5$.

The binder resin constituting the electrophotographic toner of the present invention 3 will be explained below.

The binder resin used in the present invention 3 is composed of a styrene/acrylate copolymer or a styrene/methacrylate copolymer as an essential component.

The above styrene monomer includes styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decanylstyrene, p-n-dodecylstyrene, p-methoxystyrene, p-phenylstyrene, p-chlorostyrene and 3,4-dichlorostyrene.

The above (meth)acrylate monomer includes methyl acrylate, ethyl acrylate, n-butyl acrylate, isobutyl acrylate, propyl acrylate, n-octyl acrylate, dodecyl acrylate, lauryl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate and diethylaminoethyl methacrylate.

In addition to the styrene/(meth)acrylate copolymer, the electrophotographic toner of the present invention 3 may further contain other binder resin in an amount up to 50% by weight based on the total binder resin amount so long as the "other" binder resin has no adverse effect on the effect of the present invention 3. The "other" binder resin includes a polystyrene resin, a polyacrylate resin, polyvinyl chloride, polyvinyl acetate, polyvinylidene chloride, a phenolic resin and an epoxy resin.

The method of producing the resin having at least two maximal values, used in the present invention 3, is as described in Synthesis Examples 1 to 4 to be described later. In Synthesis Example 1, a resin is prepared by the polymerization in the presence of a Fischer-Tropsch wax, while the Fischer-Tropsch wax may be incorporated when a mixture for the toner is melted and kneaded under heat as shown in Examples 12 to 15.

The present invention 4 is directed to an electrophotographic toner containing a binder resin and a colorant as main components, the binder resin containing a vinyl-containing copolymer formed by polymerization in the presence of a Fischer-Tropsch wax formed from natural gas and/or a Fischer-Tropsch wax formed from coal.

The present invention 5 is directed to a process for the production of an electrophotographic toner containing a binder resin and a colorant as main components, which comprises solution-polymerizing, suspension-polymerizing or emulsion-polymerizing a vinyl-containing monomer in which a Fischer-Tropsch wax formed from natural gas and/or a Fischer-Tropsch wax formed from coal are/is dissolved in advance, to prepare the binder resin.

The electrophotographic toner of the present invention 4 is composed mainly of a colorant and a binder resin containing a vinyl-containing copolymer formed by polymerization in the presence of a Fischer-Tropsch wax formed from natural gas and/or a Fischer-Tropsch wax formed from coal, and it may further contain additives such as a charge controlling agent as required.

The Fischer-Tropsch wax formed from natural gas preferably has a melting point of 85° to 100° C. when measured with DSC. The Fischer-Tropsch wax formed from coal has a melting point of 80° to 110° C., preferably 85° to 110° C., when measured by DSC. Any one of the above Fischer-Tropsch waxes, having a melting point lower than the above lower limit, is liable to cause the shelf life problem of the toner, and is liable to degrade the flowability of the toner. When the melting points of the Fischer-Tropsch waxes are higher than the above upper limits, the Fischer-Tropsch waxes have almost no effect on decreasing the melt viscosity, and it is therefore difficult to impart the toner with low-temperature fixing properties. Further, when the suspension or emulsion polymerization is carried out in water as a solvent, the reaction system has a temperature higher than the boiling point of the solvent.

The polymerizable monomer to constitute the binder resin in each of the present inventions 4 and 5 will be explained below.

The vinyl-containing monomer used in the present inventions 4 and 5 includes styrene, o-methylstyrene, m-methylstyrene, p-methylsyrene, α-methylstyrene, p-ethylstyrene, 2,4-dimethylstyrene, p-n-butylstyrene, p-n-hexylstyrene, p-n-octylstyrene, p-methoxystyrene, p-phenylstyrene and p-chlorostyrene. The acrylate monomer or methacrylate monomer includes alkyl esters of acrylic acid or methacrylic acid such as methyl acrylate, ethyl acrylate, propyl acrylate, n-butyl acrylate, isobutyl acrylate, n-octyl acrylate, 2-ethylhexyl acrylate, methyl methacrylate, ethyl methacrylate, propyl methacrylate, n-butyl methacrylate, isobutyl methacrylate and n-octyl methacrylate, 2-chloroethyl acrylate, phenyl acrylate, methyl α-chloroacrylate, 2-hydroxyethyl acrylate, 2-hydroxypropyl acrylate, 2-hydroxybutyl acrylate, glycidyl acrylate, phenyl methacrylate, dimethylaminoethyl methacrylate, diethylaminoethyl methacrylate, 2-hydroxyethyl methacrylate, 2-hydroxypropyl methacrylate, 2-hydroxybutyl methacrylate, glycidyl methacrylate, bisglycidyl methacrylate, and polyethylene glycol dimethacrylate. Particularly preferred are 2-ethylhexyl acrylate, n-butyl acrylate, methyl methacrylate and n-butyl methacrylate. The other vinyl-containing monomer includes acrylic acids such as acrylic acid, methacrylic acid, α-ethylacrylic acid and crotonic acid and α- or β-alkyl derivatives thereof; unsaturated dicarboxylic acids such as fumaric acid, maleic acid, citraconic acid and itaconic acid and monoester and diester derivatives thereof; monoacroyloxyethyl succinate, monomethacryloyloxyethyl succinate, acrylonitrile, methacrylonitrile and acrylamide.

The process for the production of an electrophotographic toner according to the present invention 5 will be explained below.

The Fischer-Tropsch wax formed from natural gas and the Fischer-Tropsch wax formed from coal used in the present invention 5 have low melting points as compared with propylene wax, and they therefore show poor dispersibility in the binder resin when melted and kneaded together with the binder resin (obtained by polymerization carried out in advance) and the colorant.

That is, the Fischer-Tropsch wax formed from natural gas and the Fischer-Tropsch wax formed from coal used in the present invention have a great difference in melt viscosity from conventional binder resins such as a styrene/(meth)acrylate copolymer, etc. For fully dispersing the Fischer-Tropsch wax in any conventional binder resin, it is therefore required to decrease the kneading temperature to a temperature around the melting point of the Fischer-Tropsch wax. Even if the kneading temperature is decreased, no sufficient dispersion is obtained. Further, when the kneading temperature is too low, a polymer having a higher molecular weight as part of the binder resin is sectioned, and the toner shows poor offsetting resistance at a high temperature.

In the present inventions 4 and 5, the dispersibility of the Fischer-Tropsch wax(es) is improved by allowing the Fischer-Tropsch wax(es) to be present when the polymerization of the vinyl-containing monomer is initiated and polymerizing the vinyl-containing monomer in the presence of the Fischer-Tropsch wax(es). Specifically, (1) the vinyl-containing monomer is heated, then the Fischer-Tropsch wax(es) is dissolved in the vinyl-containing monomer, and the vinyl-containing monomer is radical-polymerized. (2) The Fischer-Tropsch wax(es) is dissolved in a heated solvent, and then the vinyl-containing monomer is radical-polymerized in the solvent. The Fischer-Tropsch wax(es) can be homogeneously dispersed in the resin by any one of the above two methods (1) and (2).

Therefore, when the toner is produced through kneading and pulverization steps, the amount of wax exposed onto the toner surface and the amount of wax dissociated from the toner decrease. As a result, the wax-wax contact decreases to improve the shelf life. Further, the wax-wax contact is further decreased by adding an additive such as silica particles to allow them to adhere to the toner surface, whereby the toner is further improved in shelf life.

That is, the present invention 5 has a characteristic feature in that the process for the production of an electrophotographic toner containing a binder resin and a colorant as main components includes the preparation of the binder resin by suspension-polymerizing or emulsion-polymerizing a vinyl-containing monomer in which the Fischer-Tropsch wax(es) is dissolved in advance.

The preparation of the binder resin in the present invention 5 will be explained more in detail below.

The binder resin is prepared by the steps of (1) mixing a first vinyl-containing monomer with a polymerization initiator to form an oil phase ①, (2) dissolving the Fischer-Tropsch wax formed from natural gas or the Fischer-Tropsch wax formed from coal in a second vinyl-containing monomer and adding a polymerization initiator, to form an oil phase ②, (3) adding a dispersing agent to water to form an aqueous phase, (4) adding the above oil phase ① to the above aqueous phase and suspension-polymerizing the first vinyl-containing monomer by heating and stirring the mixture, to form a vinyl-containing copolymer, and (5) adding the oil phase ② to the above suspension of the vinyl-containing copolymer and suspension-polymerizing the second vinyl-containing monomer by heating and stirring the mixture.

In another embodiment, the binder resin is also prepared by the steps of (1) providing an oil phase ① of a first vinyl-containing monomer, (2) dissolving the Fischer-Tropsch wax formed from natural gas or the Fischer-Tropsch wax formed from coal in a second vinyl-containing monomer, to form an oil phase ②, (3) adding a polymerization initiator to water to prepare two sets of an aqueous phase, (4) adding the above oil phase ① to one set of the above aqueous phase and emulsion-polymerizing the first vinyl-containing monomer by heating and stirring the mixture, to form a first vinyl-containing copolymer ①, (5) adding the oil phase ② to the other set of the above aqueous phase and emulsion-polymerizing the second vinyl-containing monomer by heating and stirring the mixture, to form a second vinyl-containing copolymer ②, and (6) mixing the above vinyl-containing copolymer ① with the above vinyl-containing copolymer ②.

In further another embodiment, the binder resin is prepared by the steps of (1) providing an oil phase ① of a first vinyl-containing monomer, (2) dissolving the Fischer-Tropsch wax formed from natural gas or the Fischer-Tropsch wax formed from coal in a second vinyl-containing monomer and adding a polymerization initiator, to form an oil phase ②, (3) adding a polymerization initiator to water to form an aqueous phase ①, (4) adding a dispersing agent to water to form an aqueous phase ②, (5) adding the above oil phase ① to the above aqueous phase ① and emulsion-polymerizing the first vinyl-containing monomer by heating and stirring the mixture, to form a vinyl-containing copolymer ①, (6) adding the above oil phase ② to the above aqueous phase ② and suspension-polymerizing the second vinyl-containing monomer by heating and stirring the mixture, to form a vinyl-containing copolymer ②, and (7) mixing the above vinyl-containing copolymer ① with the above vinyl-containing copolymer ②.

In still further another embodiment, the binder resin is prepared by the steps of (1) mixing a first vinyl-containing monomer with a polymerization initiator to form an oil phase, (2) adding a dispersing agent to water to form an aqueous phase, (3) adding the above oil phase to the above aqueous phase and suspension-polymerizing the first vinyl-containing monomer by heating and stirring the mixture, to form a first vinyl-containing copolymer, and (4) adding the above first vinyl-containing copolymer, a second vinyl-containing monomer, either the Fischer-Tropsch wax formed from natural gas or the Fischer-Tropsch wax formed from coal, and a polymerization initiator to a solvent, and solution-polymerizing the second vinyl-containing monomer by heating and stirring the mixture.

Further, in another embodiment, the binder resin is prepared by the steps of (1) providing an oil phase of a first vinyl-containing monomer, (2) adding a polymerization initiator to water to form an aqueous phase, (3) adding the above oil phase to the above aqueous phase and emulsion-polymerizing the first vinyl-containing monomer by heating and stirring the mixture, to form a first vinyl-containing copolymer, and (4) adding the above first vinyl-containing copolymer, a second vinyl-containing monomer, either the Fischer-Tropsch wax formed from natural gas or the Fischer-Tropsch wax formed from coal, and a polymerization initiator to a solvent, and solution-polymerizing the second vinyl-containing monomer by heating and stirring the mixture.

In the above embodiments, the first vinyl-containing monomer and the second vinyl-containing monomer may be a combination of the same or different monomers.

Generally, a binder resin obtained by suspension polymerization has a low molecular weight, a binder resin obtained by solution polymerization has a lower molecular weight than the above resin obtained by suspension polymerization, and a binder resin obtained by emulsion polymerization has a high molecular weight. It is therefore preferred to mix a binder resin obtained by suspension polymerization and/or a binder resin obtained by solution polymerization with a binder resin obtained by emulsion polymerization as required depending upon required properties of the toner.

In this case, the above wax(es), the colorant and other additive(s) may be co-present when the vinyl-containing copolymer is produced by polymerization. The process for the production of an electrophotographic toner, provided by the present invention, is carried out by mixing the binder resin formed of the above vinyl-containing copolymer, the colorant and additive(s) in desired amounts, and melting and kneading the mixture under heat, followed by pulverizing and classifying.

A polypropylene wax (melting point 135°–145° C.) used in a conventional electrophotographic toner is excellent in high-temperature offsetting resistance. However, the above polypropylene wax is not suitable for fixing at a low-temperature due to its high melting point. It has been therefore proposed to add a wax which has a low melting point and shows a sharp fusing behavior for decreasing the melt initiation temperature of the toner. A petroleum-based paraffin wax and a low-melting-point microcrystalline wax containing isoparaffin, naphthene, an aromatic compound or the like, which are hitherto known to be waxes having low melting points, have a shelf life problem due to their low molecular weights. Further, the above petroleum-based wax and the above microcrystalline wax have a high rate of penetration, as high as 5 or more, and they therefore show a decreased flowability as a fine powder like a toner, and are liable to have an undesirable effect on image characteristics.

The Fischer-Tropsch wax formed from natural gas and the Fischer-Tropsch wax formed from coal, used in the present invention, are excellent in low-temperature fixing properties since they have lower melting points than any polypropylene wax. Further, the above Fischer-Tropsch waxes are excellent in shelf life since the amount of components having low melting points is very small as compared with existing petroleum-based and coal-based paraffin waxes, and the above Fischer-Tropsch waxes have no adverse effect on the flowability of the toner and cause no problem on tribocharge since the rate of penetration thereof is as low as 2 or less.

In the present invention 2, the Fischer-Tropsch wax(es) is improved in dispersibility in the binder resin by decreasing the melt viscosity difference between the Fischer-Tropsch wax(es) and the binder resin. As a result, the fixing strength at a low temperature is improved, and the high-temperature offsetting resistance is improved.

In the present invention 3 directed to an electrophotographic toner containing the Fischer-Tropsch wax(es), the melt viscosity difference between the binder resin and the Fischer-Tropsch wax(es) is decreased due to the use of the binder resin which shows two maximal values when measured by GPC (gel permeation chromatography), one maximal value being at least $8 \times 10^5$, the other being in the range of from 3,000 to 10,000. As a result, the Fischer-Tropsch wax(es) is improved in the dispersibility in the binder resin.

In the present inventions 4 and 5, the dispersibility of the Fischer-Tropsch wax(es) in the binder resin is improved by copolymerizing the vinyl-containing monomer in which the Fischer-Tropsch wax(es) is dissolved in advance, for producing an electrophotographic toner containing the Fischer-Tropsch wax(es).

According to the present invention, there is provided an electrophotographic toner which maintains a sufficient offsetting-free temperature range and can be fixed at a low temperature and which is excellent in fixing properties and can give a great number of copies having sufficient image density, and there is also provided a process for the production of the above electrophotographic toner.

When used with a copying machine or a printer, the electrophotographic toner of the present invention has effects that the electric power consumption can be decreased, the machine cost can be decreased by decreasing the pressure of a roll, and the copying speed can be increased.

The present invention will be explained with reference to Examples hereinafter, in which "part" stands for "part by weight".

EXAMPLE 1

| | |
|---|---|
| Styrene-acrylate copolymer resin (trade name: CPR100, supplied by Mitsui Toatsu Chemicals, Inc.) | 98 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 2 parts |

The above raw materials were mixed with a super mixer and melt-kneaded under heat with a twin-screw kneader. The kneaded mixture was pulverized with a jet mill and classified with a dry air-current classifier to give particles having an average particle diameter of 10 μm. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

EXAMPLE 2

| | |
|---|---|
| Styrene-acrylate copolymer resin (trade name: CPR100, supplied by Mitsui Toatsu Chemicals, Inc.) | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 6 parts |

Particles having an average particle diameter of 10 μm were obtained from the above raw materials in the same manner as in Example 1. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

EXAMPLE 3

| | |
|---|---|
| Styrene-acrylate copolymer resin (trade name: CPR100, supplied by Mitsui Toatsu Chemicals, Inc.) | 88 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 12 parts |

Particles having an average particle diameter of 10 μm were obtained from the above raw materials in the same manner as in Example 1. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

EXAMPLE 4

| | |
|---|---|
| Styrene-acrylate copolymer resin (trade name: CPR100, supplied by Mitsui Toatsu Chemicals, Inc.) | 80 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 20 parts |

Particles having an average particle diameter of 10 μm were obtained from the above raw materials in the same manner as in Example 1. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

EXAMPLE 5

| | |
|---|---|
| Styrene-acrylate copolymer resin (trade name: CPR100, supplied by Mitsui Toatsu Chemicals, Inc.) | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (melting point 88° C., rate of penetration 2, supplied by Shell MDS (Malaysia) Sdn. Bhd.) | 6 parts |

Particles having an average particle diameter of 10 μm were obtained from the above raw materials in the same manner as in Example 1. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

EXAMPLE 6

| | |
|---|---|
| Styrene-acrylate copolymer resin (trade name: CPR100, supplied by Mitsui Toatsu Chemicals, Inc.) | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (melting point 98° C., rate of penetration 1, supplied by Shell MDS (Malaysia) Sdn. Bhd.) | 6 parts |

Particles having an average particle diameter of 10 μm were obtained from the above raw materials in the same manner as in Example 1. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

COMPARATIVE EXAMPLE 1

A comparative electrophotographic toner was obtained in the same manner as in Example 2 except that the Fischer-Tropsch wax formed from natural gas was replaced with 6 parts by weight of a commercially available polypropylene wax (trade name: Viscol 550P, melting point 145° C., supplied by Sanyo Chemical Industries, Ltd.).

COMPARATIVE EXAMPLE 2

A comparative electrophotographic toner was obtained in the same manner as in Example 2 except that the Fischer-Tropsch wax formed from natural gas was replaced with 6 parts by weight of a petroleum-based paraffin wax (trade name: No. 155, melting point 70° C., rate of penetration 15, supplied by Nippon Seiro Co., Ltd.).

COMPARATIVE EXAMPLE 3

A comparative electrophotographic toner was obtained in the same manner as in Example 2 except that the Fischer-Tropsch wax formed from natural gas was replaced with 6 parts by weight of a petroleum-based paraffin wax (trade name: HNP-0190, melting point 87° C., rate of penetration 6, supplied by Nippon Seiro Co., Ltd.).

COMPARATIVE EXAMPLE 4

A comparative electrophotographic toner was obtained in the same manner as in Example 2 except that the Fischer-Tropsch wax formed from natural gas was replaced with 6 parts by weight of a Fischer-Tropsch wax formed from coal (trade name: H1, two melting points of 80° C. and 107° C., rate of penetration 1, supplied by SASOL, South African Coal Oil & Gas Corp., Ltd.).

The electrophotographic toners obtained in the above Examples and Comparative Examples were tested as follows.

(1) Offsetting-free temperature range and offsetting-free temperature width

4 Parts of an electrophotographic toner sample and 96 parts of a non-coated ferrite carrier (trade name: FL-1020, supplied by Powder Tech. Co., Ltd.) were mixed, to obtain a two-component developer. Then, the developer was used together with a commercially available copying machine (trade name: SF-9800, supplied by Sharp Corp.) to form a strip-like unfixed image having a width of 2 cm and a length of 5 cm on each of a plurality of transfer sheets having a size of A4.

Then, a fixing machine having a heat-fixing roll having a surface layer formed of Teflon and a pressure fixing roll having a surface layer formed of silicone rubber, which were rotated together with each other, was adjusted such that the roll pressure was 1 kg/cm² and the roll speed was 50 mm/sec. While the surface temperature of the heat-fixing roll was changed stepwise, a toner image of the transfer sheet having the unfixed image was fixed at each surface temperature. In this case, it was observed whether or not the blank portion on each transfer sheet was scummed with the toner, and the temperature range in which no scumming took place was taken as an offsetting-free temperature range. Further, a difference between the maximum value and the minimum value of the offsetting-free temperature range was taken as an offsetting free temperature width.

(2) Fixing strength

The surface temperature of the above fixing machine was set at 130° C., and a toner image of the transfer sheet having the unfixed image was fixed. The fixed image was measured for an image density with a reflection densitometer (trade name: RD-914, supplied by Macbeth). Then, a cotton pad was rubbed against the fixed image, and the image was measured for a density in the same manner as above. A fixing strength was calculated on the basis of the measurement values according to the following equation, and was taken as an index for low-energy fixing properties.

Fixing strength (%)=(image density of fixed image after rubbing/ image density of fixed image before rubbing)×100

(3) Flowability

A toner sample was measured for an apparent density according to JIS K5101. The apparent density is an index for the flowability of a toner.

(4) Shelf life

20 Grams of a toner sample was placed in a 150 cc polyethylene bottle, and stored in a constant-temperature vessel at 50° C. for 24 hours. Then, the sample was allowed to cool to room temperature, and the toner was taken out of the bottle and observed for fusion states (blocking) among toner particles. A toner which caused no fusion was rated as A, and a toner which caused fusion so that a problem would take place in practical use was rated as B.

Table 1 shows the results.

Table 1 shows that the electrophotographic toners according to the present invention (in Examples 1 to 6) caused no offsetting in the broad offsetting-free temperature range from low temperature to high temperature and that the temperature width was 70° C.–85° C. or sufficient for practical use. The toners according to the present invention showed a fixing strength of at least 80% at 130° C., and the fixing strength was acceptable for practical use. It was also found that the toners according to the present invention were also acceptable for practical use concerning their flowability and shelf life.

In contrast, the toner obtained in Comparative Example 1 showed not only a high offsetting-free temperature on the low temperature side but also a low fixing strength as low as 66%.

The toner obtained in Comparative Example 2 showed a narrow offsetting-free temperature width as narrow as 55° C., had a low apparent density for flowability, and had a poor shelf life.

The toners obtained in Comparative Examples 3 and 4 caused fusion in the test for a shelf life so that they were unacceptable in practical use.

Further, the developers containing the toners obtained in Examples, prepared in the above (1), were used for continuously making up to 10,000 copies with a commercially available copying machine (trade name: BD-3810, supplied by Toshiba Corp.). Table 2 shows the results.

As a result, it was found that all the toners obtained in Examples 1 to 6 were acceptable concerning image density, fogging of non-image portion and tribocharge. The original used for continuously making the copies had a size of A4 having 6% of a black portion. The copies were measured for image density with a reflection densitometer RD-914 (supplied by Macbeth), for fogging with a color difference meter (supplied by Nippon Denshoku Kogyo Co., Ltd.) and for tribocharge with a blow-off tribocharge measuring apparatus supplied by Toshiba Chemical Co., Ltd.).

TABLE 1

|  | Offsetting-free temperature range (°C.) | Offsetting-free temperature width (°C.) | Fixing strength (%) | Flow-ability (g/cm³) | Shelf life |
| --- | --- | --- | --- | --- | --- |
| Ex. 1 | 115–185 | 70 | 80 | 0.36 | A |
| Ex. 2 | 110–190 | 80 | 82 | 0.36 | A |
| Ex. 3 | 105–190 | 85 | 88 | 0.35 | A |
| Ex. 4 | 105–180 | 75 | 90 | 0.34 | A |
| Ex. 5 | 110–190 | 80 | 85 | 0.36 | A |
| Ex. 6 | 110–190 | 80 | 83 | 0.36 | A |
| CEx. 1 | 120–190 | 70 | 66 | 0.36 | A |
| CEx. 2 | 105–160 | 55 | 88 | 0.32 | B |
| CEx. 3 | 110–180 | 70 | 84 | 0.33 | B |
| CEx. 4 | 110–190 | 80 | 80 | 0.33 | B |

Ex. = Example,
CEx. = Comparative Example

TABLE 2

|  | Image density | | Fogging | | Tribocharge | |
| --- | --- | --- | --- | --- | --- | --- |
|  | Initial | 10,000th | Initial | 10,000th | Initial | 10,0000th |
| Ex. 1 | 1.41 | 1.39 | 0.32 | 0.38 | −26.5 | −27.8 |
| Ex. 2 | 1.38 | 1.41 | 0.35 | 0.40 | −26.0 | −25.2 |
| Ex. 3 | 1.39 | 1.37 | 0.41 | 0.48 | −26.8 | −25.9 |
| Ex. 4 | 1.37 | 1.35 | 0.50 | 0.52 | −26.3 | −25.4 |
| Ex. 5 | 1.38 | 1.40 | 0.37 | 0.41 | −26.6 | −28.3 |
| Ex. 6 | 1.37 | 1.39 | 0.43 | 0.52 | −26.5 | −27.2 |

Ex. = Example

EXAMPLE 7

| | |
| --- | --- |
| Styrene-acrylate copolymer resin (monomer composition = styrene/butyl acrylate, number average molecular weight (Mn): 4.0 × 10³, weight average molecular weight (Mw): 20.5 × 10⁴, melt initiation temperature 107° C., melt viscosity at 110° C. 9 × 10⁵ poise) | 92 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 8 parts |

The above raw materials were mixed with a super mixer and melt-kneaded under heat with a twin-screw kneader (temperature set at 105° C.). The kneaded mixture was pulverized with a jet mill and classified with a dry air-current classifier to give particles having an average particle diameter of 10 μm. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered. The toner had a melt viscosity, measured at 110° C., of 9×10$^5$ poise.

EXAMPLE 8

| | |
|---|---|
| Styrene-acrylate copolymer resin (monomer composition = styrene/butyl acrylate, Mn: 3.6 × 10$^3$, Mw: 19.3 × 10$^4$, melt initiation temperature 103° C., melt viscosity at 110° C. 7 × 10$^5$ poise) | 92 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 8 parts |

Particles having an average particle diameter of 10 μm were obtained in the same manner as in Example 7 except that the temperature for the melt-kneading was changed from 105° C. to 100° C. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered. The toner had a melt viscosity, measured at 110° C., of 7×10$^5$ poise.

EXAMPLE 9

| | |
|---|---|
| Styrene-acrylate copolymer resin (monomer composition = styrene/butyl acrylate, Mn: 3.4 × 10$^3$, Mw: 18.1 × 10$^4$, melt initiation temperature 100° C., melt viscosity at 110° C. 6 × 10$^5$ poise) | 92 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd) | 8 parts |

Particles having an average particle diameter of 10 μm were obtained in the same manner as in Example 7 except that the temperature for the melt-kneading was changed from 105° C. to 100° C. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered. The toner had a melt viscosity, measured at 110° C., of 6×10$^5$ poise.

EXAMPLE 10

| | |
|---|---|
| The same styrene-acrylate copolymer resin as that used in Example 9 | 85 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 15 parts |

Particles having an average particle diameter of 10 μm were obtained in the same manner as in Example 7 except that the temperature for the melt-kneading was changed from 105° C. to 100° C. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered. The toner had a melt viscosity, measured at 110° C. of 6×10$^5$ poise

COMPARATIVE EXAMPLE 5

A comparative electrophotographic toner was obtained in the same manner as in Example 7 except that the styrene-acrylate copolymer resin was replaced with 92 parts of a styrene-acrylate copolymer resin having a melt initiation temperature of 117° C. and a melt viscosity, measured at 120° C., of 7×10$^5$ poise (melt viscosity at 110° C. not measurable) (trade name: CPR-120, supplied by Mitsui Toatsu Chemicals, Inc.). The toner had a melt viscosity, measured at 120° C., of 6×10$^5$ poise.

COMPARATIVE EXAMPLE 6

A comparative electrophotographic toner was obtained in the same manner as in Example 10 except that the styrene-acrylate copolymer resin was replaced with 85 parts of a styrene-acrylate copolymer resin having a melt initiation temperature of 117° C. and a melt viscosity, measured at 120° C., of 7×10$^5$ poise (melt viscosity at 110° C. not measurable) (trade name: CPR-120, supplied by Mitsui Toatsu Chemicals, Inc.). The toner had a melt viscosity, measured at 120° C., of 6×10$^5$ poise.

COMPARATIVE EXAMPLE 7

A comparative electrophotographic toner was obtained in the same manner as in Example 7 except that the styrene-acrylate copolymer resin was replaced with 92 parts of a styrene-acrylate copolymer resin having a melt initiation temperature of 117° C. and a melt viscosity, measured at 120° C., of 7×10$^5$ poise (melt viscosity at 110° C. not measurable) (trade name: CPR-120, supplied by Mitsui Toatsu Chemicals, Inc.), that the Fischer-Tropsch wax formed from natural gas was replaced with 8 parts of a polypropylene wax (trade name: Viscol 550P, melting point 145° C., supplied by Sanyo Chemical Industries, Ltd.) and that the temperature for the melt-kneading was changed to 130° C. The toner had a melt viscosity, measured at 120° C., of 7×10$^5$ poise.

COMPARATIVE EXAMPLE 8

A comparative electrophotographic toner was obtained in the same manner as in Example 9 except that the Fischer-Tropsch wax formed from natural gas was replaced with 8 parts of a polypropylene wax (trade name: Viscol 550P, melting point 145° C., supplied by Sanyo Chemical Industries, Ltd.). The toner had a melt viscosity, measured at 110° C., of 6×10$^5$ poise.

COMPARATIVE EXAMPLE 9

A comparative electrophotographic toner was obtained in the same manner as in Example 9 except that the Fischer-Tropsch wax formed from natural gas was replaced with 8 parts of a polyethylene wax (trade name: PE-190, melting point 132° C., rate of penetration 1, supplied by Hoechst). The toner had a melt viscosity, measured at 110° C., of 6×10$^5$ poise.

The electrophotographic toners obtained in the above Examples and Comparative Examples were tested in the same manner as in Example 1, and Table 3 shows the results.

Table 3 shows that the electrophotographic toners according to the present invention caused no offsetting in the broad offsetting-free temperature range from low temperature to high temperature and that the temperature width was 80° C.–85° C. or sufficient for practical use. The toners according to the present invention showed a fixing strength sufficient for practical use, as high as at least 80% at 130° C., so that they are acceptable for use with an automatic document feeder.

In contrast, the toners obtained in Comparative Examples 5, 6 and 7 showed not only a high offsetting-free temperature on the low temperature side but also a low fixing strength as low as 50% or less. Further, the toners obtained in Comparative Examples 5 and 6 showed a low upper limit of the offsetting-free temperature range, as low as 180° C., and further, they showed a narrow offsetting-free temperature width as narrow as 50° C.

Further, the toners obtained in Comparative Examples 8 and 9 were poor in the offsetting-free temperature range and the fixing strength as compared with the toners obtained in Examples.

Further, the toners obtained in Comparative Examples 6, 8 and 9 had a low apparent density or poor flowability since the dispersibility of the wax in the electrophotographic toner was poor.

Further, the developers containing the toners obtained in Examples 7 to 10 were used for continuously making up to 10,000 copies with a commercially available copying machine (trade name: BD-3810, supplied by Toshiba Corp.). Table 2 shows the results. It was found that all the toners obtained in Examples 7 to 10 were acceptable for practical use since the tribocharge was maintained at a value of −25 μc/g to −28 μc/g from a first copy to a 10,000th copy, the image density was maintained at a value of 1.38 to 1.41 from a first copy to a 10,000th copy, and the copies were almost free of fogging. On the other hand, when the toners obtained in Comparative Examples 5 to 9 were used for continuously making copies, copies had image defects such as streaks and the missing of end portion of an image from an initial stage each, and the continuous copying test was omitted.

Table 4 shows the results of the continuous copying test of the toners obtained in Examples 7 to 10.

Further, 20 g each of the electrophotographic toners obtained in Examples 7 to 10 were placed in a 150 cc polyethylene bottles, stored in a constant-temperature vessel at 50° C. for 24 hours, then allowed to cool to room temperature and observed, to show no defect. It was therefore found that the toners obtained in Examples 7 to 10 were acceptable in practical use.

TABLE 3

| | Offsetting-free temperature range (°C.) | Offsetting-free temperature width (°C.) | Fixing strength (%) | Flow-ability (g/cm³) |
| --- | --- | --- | --- | --- |
| Ex. 7 | 115–200 | 85 | 80 | 0.36 |
| Ex. 8 | 115–200 | 85 | 84 | 0.36 |
| Ex. 9 | 110–190 | 80 | 89 | 0.36 |
| Ex. 10 | 110–190 | 80 | 93 | 0.35 |
| CEx. 5 | 130–180 | 50 | 48 | 0.34 |
| CEx. 6 | 130–170 | 40 | 47 | 0.32 |
| CEx. 7 | 130–200 | 70 | 45 | 0.36 |
| CEx. 8 | 120–190 | 70 | 77 | 0.31 |
| CEx. 9 | 120–190 | 70 | 79 | 0.31 |

Ex. = Example,
CEx. = Comparative Example

TABLE 4

| | Image Density | | Fogging | | Tribocharge | |
| --- | --- | --- | --- | --- | --- | --- |
| | Initial | 10,000th | Initial | 10,000th | Initial | 10,000th |
| Ex. 7 | 1.41 | 1.39 | 0.41 | 0.53 | −25.4 | −26.8 |
| Ex. 8 | 1.40 | 1.39 | 0.38 | 0.48 | −25.8 | −27.2 |
| Ex. 9 | 1.38 | 1.40 | 0.45 | 0.55 | −26.4 | −27.5 |
| Ex. 10 | 1.40 | 1.41 | 0.40 | 0.51 | −26.0 | −27.0 |

Ex. = Example

SYNTHESIS EXAMPLE 1

(Synthesis of Polymer Having Higher Molecular Weight)

(Preparation of oil phase)

0.5 Part of 2,2'-azobis-(2,4-dimethylvaleronitrile) (polymerization initiator) was mixed with a mixture of 70 parts of styrene and 30 parts of n-butyl acrylate to obtain an oil phase.

(Preparation of aqueous phase)

0.04 Part of sodium dodecylsulfonate (0.02 part per 100 parts of aqueous phase) was added to a mixture of 200 parts of deionized water and 210 parts of calcium tertiary phosphate, and then the mixture was stirred to obtain an aqueous phase.

(preparation of resin)

The above aqueous phase and the above oil phase were placed in a separable flask, and the mixture was stirred at 300 rpm with a high-speed stirrer for 1 minute, to form a suspension. The suspension was heated at 60° C. for 7 hours, at 80° C. for 2 hours and further at 90° C. for 1 hour, to polymerize the contained polymerizable monomers. The reaction mixture was cooled to room temperature, and polymer particles were recovered by filtration and dried to give a polymer resin having a higher molecular weight. The resin showed a maximal value of $1.2\times10^6$ when measured by GPC.

15 Parts of the above-obtained polymer resin having a higher molecular weight, 6 parts of a Fischer-Tropsch wax formed from natural gas (FT-100, melting point 91° C., supplied by Shell MDS (Malaysia) Sdn. Bhd.) and 100 parts of xylene were charged into a flask, and dissolved. The inner atmosphere of the flask was replaced with nitrogen gas, and the mixture was heated up to the boiling point of xylene. While the mixture was stirred under the reflux of xylene, a mixture containing 67 parts of styrene, 12 parts of n-butyl acrylate and 3 parts of benzoyl peroxide (polymerization initiator) were dropwise added over 2 hours to carry out a solution polymerization. After the addition was completed, the reaction mixture was aged for 1 hour with stirring under the reflux of xylene, to give a styrene/acrylate copolymer resin having molecular weight maximal values, measured by GPC, of 8,000 and $1.2\times10^6$ and containing 15% by weight of the polymer having a higher molecular weight, for use in an electrophotographic toner of the present invention.

SYNTHESIS EXAMPLE 2

(Synthesis of Polymer Having Higher Molecular Weight)

(Preparation of oil phase)

0.5 Part of 2,2'-azobis-(2,4-dimethylvaleronitrile) (polymerization initiator) was mixed with a mixture of 73 parts of styrene and 27 parts of n-butyl acrylate to obtain an oil phase.

(Preparation of aqueous phase)

0.04 Part of sodium dodecylsulfonate (0.02 part per 100 parts of aqueous phase) was added to a mixture of 200 parts of deionized water and 210 parts of calcium tertiary phosphate, and then the mixture was stirred to obtain an aqueous phase.

(preparation of resin)

The above aqueous phase and the above oil phase were placed in a separable flask, and the mixture was stirred at 300 rpm with a high-speed stirrer for 1 minute, to form a suspension. The suspension was heated at 60° C. for 7 hours, at 80° C. for 2 hours and further at 90° C. for 1 hour, to polymerize the contained polymerizable monomers. The reaction mixture was cooled to room temperature, and polymer particles were recovered by filtration and dried to give a polymer resin having a higher molecular weight. The resin showed a maximal value of $1.0 \times 10^6$ when measured by GPC.

20 Parts of the above-obtained polymer resin having a higher molecular weight and 100 parts of xylene were charged into a flask, and dissolved. The inner atmosphere of the flask was replaced with nitrogen gas, and the mixture was heated up to the boiling point of xylene. While the mixture was stirred under the reflux of xylene, a mixture containing 68 parts of styrene, 12 parts of n-butyl acrylate and 3.3 parts of benzoyl peroxide (polymerization initiator) were dropwise added over 2 hours to carry out a solution polymerization. After the addition was completed, the reaction mixture was aged for 1 hour with stirring under the reflux of xylene, to give a styrene/acrylate copolymer resin having molecular weight maximal values, measured by GPC, of 6,000 and $1.0 \times 10^6$ and containing 20% by weight of the polymer having a higher molecular weight, for use in an electrophotographic toner of the present invention.

SYNTHESIS EXAMPLE 3

(Synthesis of Polymer Having Higher Molecular Weight)

(Preparation of oil phase)

0.5 Part of 2,2'-azobis-(2,4-dimethylvaleronitrile) (polymerization initiator) was mixed with a mixture of 70 parts of styrene and 30 parts of n-butyl acrylate to obtain an oil phase.

(Preparation of aqueous phase)

0.04 Part of sodium dodecylsulfonate (0.02 part per 100 parts of aqueous phase) was added to a mixture of 200 parts of deionized water and 210 parts of calcium tertiary phosphate, and then the mixture was stirred to obtain an aqueous phase.

(preparation of resin)

The above aqueous phase and the above oil phase were placed in a separable flask, and the mixture was stirred at 300 rpm with a high-speed stirrer for 1 minute, to form a suspension. The suspension was heated at 60° C. for 7 hours, at 80° C. for 2 hours and further at 90° C. for 1 hour, to polymerize the contained polymerizable monomers. The reaction mixture was cooled to room temperature, and polymer particles were recovered by filtration and dried to give a polymer resin having a higher molecular weight. The resin showed a maximal value of $1.2 \times 10^6$ when measured by GPC.

15 Parts of the above-obtained polymer resin having a higher molecular weight and 100 parts of xylene were charged into a flask, and dissolved. The inner atmosphere of the flask was replaced with nitrogen gas, and the mixture was heated up to the boiling point of xylene. While the mixture was stirred under the reflux of xylene, a mixture containing 72 parts of styrene, 13 parts of n-butyl acrylate and 3.3 parts of benzoyl peroxide (polymerization initiator) were dropwise added over 2 hours to carry out a solution polymerization. After the addition was completed, the reaction mixture was aged for 1 hour with stirring under the reflux of xylene, to give a styrene/acrylate copolymer resin having molecular weight maximal values, measured by GPC, of 6,000 and $1.2 \times 10^6$ and containing 15% by weight of the polymer having a higher molecular weight, for use in an electrophotographic toner of the present invention.

SYNTHESIS EXAMPLE 4

(Synthesis of Polymer Having Higher Molecular Weight)

(Preparation of oil phase)

0.4 Part of 2,2'-azobis-(2,4-dimethylvaleronitrile) (polymerization initiator) was mixed with a mixture of 70 parts of styrene and 30 parts of n-butyl acrylate to obtain an oil phase.

(Preparation of aqueous phase)

0.04 Part of sodium dodecylsulfonate (0.02 part per 100 parts of aqueous phase) was added to a mixture of 200 parts of deionized water and 210 parts of calcium tertiary phosphate, and then the mixture was stirred to obtain an aqueous phase.

(preparation of resin)

The above aqueous phase and the above oil phase were placed in a separable flask, and the mixture was stirred at 300 rpm with a high-speed stirrer for 1 minute, to form a suspension. The suspension was heated at 60° C. for 8 hours, at 80° C. for 2 hours and further at 90° C. for 1 hour, to polymerize the contained polymerizable monomers. The reaction mixture was cooled to room temperature, and polymer particles were recovered by filtration and dried to give a polymer resin having a higher molecular weight. The resin showed a maximal value of $2.0 \times 10^6$ when measured by GPC.

13 Parts of the above-obtained polymer resin having a higher molecular weight and 100 parts of xylene were charged into a flask, and dissolved. The inner atmosphere of the flask was replaced with nitrogen gas, and the mixture was heated up to the boiling point of xylene. While the mixture was stirred under the reflux of xylene, a mixture containing 73.5 parts of styrene, 13.5 parts of n-butyl acrylate and 3.3 parts of benzoyl peroxide (polymerization initiator) were dropwise added over 2 hours to carry out a solution polymerization. After the addition was completed, the reaction mixture was aged for 1 hour with stirring under the reflux of xylene, to give a styrene/acrylate copolymer resin having molecular weight maximal values, measured by GPC, of 5,000 and $2.0 \times 10^6$ and containing 13% by weight of the polymer having a higher molecular weight, for use in an electrophotographic toner of the present invention.

EXAMPLE 11

| | |
|---|---|
| Styrene/acrylate copolymer resin obtained in Synthesis Example 1 (maximal values of molecular weight by GPC: 8,000 and $1.2 \times 10^6$, content of polymer having higher molecular weight: 15%) | 100 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |

The above raw materials were mixed with a super mixer and melt-kneaded under heat with a twin-screw kneader (temperature set at 110° C.). The kneaded mixture was pulverized with a jet mill and classified with a dry air-current classifier to give particles having an average particle diameter of 10 μm.

100 Parts of the above particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

The maximal values of molecular weight of the toner by GPC were 8,000 and 9×10$^5$, and the content of the polymer having a higher molecular weight was 15%.

EXAMPLE 12

| | |
|---|---|
| Styrene/acrylate copolymer resin obtained in Synthesis Example 2 (maximal values of molecular weight by GPC: 6,000 and 1.0 × 10$^6$, content of polymer having higher molecular weight: 20%) | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 6 parts |

Particles having an average particle diameter of 10 μm were obtained from the above raw materials in the same manner as in Example 11.

100 Parts of the above particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

The maximal values of molecular weight of the toner by GPC were 6,000 and 8×10$^5$, and the content of the polymer having a higher molecular weight was 20%.

EXAMPLE 13

| | |
|---|---|
| Styrene/acrylate copolymer resin obtained in Synthesis Example 3 (maximal values of molecular weight by GPC: 6,000 and 1.2 × 10$^6$, content of polymer having higher molecular weight: 15%) | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 6 parts |

Particles having an average particle diameter of 10 μm were obtained from the above raw materials in the same manner as in Example 11.

100 Parts of the above particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

The maximal values of molecular weight of the toner by GPC were 6,000 and 9×10$^5$, and the content of the polymer having a higher molecular weight was 15%.

EXAMPLE 14

| | |
|---|---|
| Styrene/acrylate copolymer resin obtained in Synthesis Example 4 (maximal values of molecular weight by GPC: 5,000 and 2 × 10$^6$, content of polymer having higher molecular weight: 13%) | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (FT-100, melting point 92° C., rate of penetration 1, supplied by Shell MDS (Malaysia) Sdn. Bhd.) | 6 parts |

Particles having an average particle diameter of 10 μm were obtained from the above raw materials in the same manner as in Example 11.

100 Parts of the above particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

The maximal values of molecular weight of the toner by GPC were 5,000 and 1.3×10$^5$, and the content of the polymer having a higher molecular weight was 13%.

EXAMPLE 15

| | |
|---|---|
| Styrene/acrylate copolymer resin obtained in Synthesis Example 3 (maximal values of molecular weight by GPC: 6,000 and 1.2 × 10$^6$, content of polymer having higher molecular weight: 15%) | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from coal (C-105, melting point 105° C., rate of penetration 1, supplied by SASOL, South African Coal Oil & Gas Corp., Ltd.) | 6 parts |

Particles having an average particle diameter of 10 μm were obtained from the above raw materials in the same manner as in Example 11.

100 Parts of the above particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

The maximal values of molecular weight of the toner by GPC were 6,000 and 9×10$^5$, and the content of the polymer having a higher molecular weight was 15%.

COMPARATIVE EXAMPLE 10

A comparative electrophotographic toner was obtained in the same manner as in Example 12 except that the styrene-acrylate copolymer resin was replaced with a resin having molecular weight maximal values, measured by GPC, of 10,000 and 5×10$^5$ and containing 40% of a polymer having a higher molecular weight (trade name: CPR-120, supplied by Mitsui Toatsu Chemicals, Inc.).

The maximal values of molecular weight of the toner by GPC were 10,000 and 5×10$^5$, and the content of the polymer having a higher molecular weight was 38%.

COMPARATIVE EXAMPLE 11

A comparative electrophotographic toner was obtained in the same manner as in Example 12 except that the styrene-acrylate copolymer resin was replaced with a crosslinked resin having only one molecular weight maximal value, measured by GPC, of 13,000 (trade name: NC-6532, supplied by Nippon Carbide Industries, Inc.).

The maximal value of molecular weight of the toner by GPC was 13,000, and the toner had a gel content of 50%.

COMPARATIVE EXAMPLE 12

A comparative electrophotographic toner was obtained in the same manner as in Example 14 except that the 6 parts of the Fischer-Tropsch wax formed from natural gas was replaced with 6 parts of a polypropylene wax (trade name: Viscol 550P, melting point 145° C., supplied by Sanyo Chemical Industries, Ltd.).

The maximal values of molecular weight of the toner by GPC were 4,500 and $1.5 \times 10^6$, and the content of the polymer having a higher molecular weight was 13%.

The electrophotographic toners obtained in the above Examples and Comparative Examples were tested in the same manner as in Example 1. Table 5 shows the results.

TABLE 5

| | Offsetting-free temperature range (°C.) | Offsetting-free temperature width (°C.) | Fixing strength (%) | Flow-ability (g/cm$^3$) | Shelf life |
|---|---|---|---|---|---|
| Ex. 11 | 115 —200 | 85 | 83 | 0.36 | A |
| Ex. 12 | 115 —200 | 85 | 80 | 0.36 | A |
| Ex. 13 | 115 —200 | 85 | 82 | 0.36 | A |
| Ex. 14 | 110 —200 | 90 | 88 | 0.36 | A |
| Ex. 15 | 115 —200 | 85 | 81 | 0.36 | A |
| CEx. 10 | 125 —200 | 75 | 56 | 0.34 | A |
| CEx. 11 | 130 —190 | 60 | 47 | 0.33 | A |
| CEx. 12 | 120 —200 | 80 | 75 | 0.35 | A |

Ex. = Example,
CEx. = Comparative Example

Table 5 shows that the electrophotographic toners according to the present invention caused no offsetting in the broad offsetting-free temperature range from low temperature to high temperature and that the temperature width was 85° C.–90° C. or sufficient for practical use. The toners according to the present invention showed a fixing strength sufficient for practical use, as high as at least 80% at 130° C., so that they are acceptable for use with an automatic document feeder.

In contrast, the toners obtained in Comparative Examples 10, 11 and 12 showed high offsetting-free temperature on the low temperature side. In particular, the toners obtained in Comparative Examples 10 and 11 showed a low fixing strength, as low as 60% or less, at a fixing temperature of 130° C. Further, the toners obtained in Comparative Examples 10 and 11 had a low apparent density or poor flowability since the dispersibility of the wax in the toner was poor.

Tribocharge and Image Density

The developers containing the toners obtained in Examples were used for continuously making up to 5,000 copies with a commercially available copying machine (trade name: BD-3810, supplied by Toshiba Corp.). The tribocharge was maintained at a value of −24 μc/g to −27 μc/g from a first copy to a 5,000th copy.

The image density was maintained at a value of 1.42 to 1.39 from a fist copy to a 5,000th copy, which shows that the toners obtained in Examples are acceptable in practical use.

Table 6 shows the tribocharge and image density measurement results.

TABLE 6

| | Image density | | Fogging | | Tribocharge | |
|---|---|---|---|---|---|---|
| | Initial | 5,000th | Initial | 5,000th | Initial | 5,000th |
| Ex. 11 | 1.41 | 1.39 | 0.44 | 0.54 | −24.4 | −26.2 |
| Ex. 12 | 1.40 | 1.41 | 0.39 | 0.48 | −24.8 | −26.5 |
| Ex. 13 | 1.42 | 1.41 | 0.42 | 0.55 | −24.2 | −25.8 |
| Ex. 14 | 1.42 | 1.40 | 0.45 | 0.57 | −24.0 | −26.4 |
| Ex. 15 | 1.41 | 1.40 | 0.42 | 0.56 | −24.4 | −26.5 |

Ex. = Example

SYNTHESIS EXAMPLE 5

(Suspension Polymerization)

(Preparation of oil phase ①)

0.5 Part of 2,2'-azobis-(2,4-dimethylvaleronitirle) (polymerization initiator) was mixed with a mixture of 73 parts of styrene and 27 parts of n-butyl acrylate.

(Preparation of oil layer ②)

A mixture of 80 parts of styrene and 14 parts of n-butyl acrylate was heated, and 6 parts of a Fischer-Tropsch wax formed from natural gas (trade name: FT-100, melting point 91° C., supplied by Shell MDS (Malaysia) Sdn. Bhd.) was dissolved. Then, the resultant mixture was cooled to room temperature. 5 Parts of 2,2'-azobis-(2,4-dimethylvaleronitrile) (polymerization initiator) was mixed with the mixture.

(Preparation of aqueous phase)

0.04 Part of sodium dodecylsulfonate was added to a mixture of 200 parts of deionized water and 10 parts of calcium tertiary phosphate, and the resultant mixture was stirred to obtain an aqueous phase.

200 Parts of the above aqueous phase and 25 parts of the above oil phase ① were placed in a separable flask, and the mixture was stirred at 1,000 rpm with a high-speed stirrer for 1 minute to form a suspension. The suspension was heated at 60° C. for 6 hours, at 80° C. for 2 hours and further at 90° C. for 1 hour to polymerize the contained polymerizable monomers, and the resultant suspension was cooled to room temperature. 75 Parts of the oil phase ② was added to the above suspension, and the mixture was stirred at 1,000 rpm with a high-speed stirrer for 1 minute to form a suspension. The suspension was heated at 90° C. for 3 hours to polymerize the contained monomers. Then, the reaction mixture was cooled to room temperature, and polymer particles were recovered by filtration, washed and dried to give a styrene/acrylate copolymer resin.

SYNTHESIS EXAMPLE 6

(Emulsion Polymerization)

(Preparation of oil phase ①)

70 Parts of styrene and 30 parts of n-butyl acrylate were mixed.

(Preparation of oil phase ②)

6 Parts of a Fischer-Tropsch wax formed from natural gas (trade name: FT-100, melting point 91° C., supplied by Shell MDS (Malaysia) Sdn. Bhd.) was dissolved in a hot mixture of 80 parts of styrene and 14 parts of n-butyl acrylate, and the mixture was cooled to room temperature.

(Preparation of aqueous phase)

0.4 Part of potassium persulfate and 0.4 part of sodium dodecylsulfate were added to 200 parts of deionized water, and the mixture was stirred to obtain an aqueous phase.

200 Parts of the above aqueous phase and 20 parts of the above oil phase ① were placed in a separable flask, and the mixture was stirred at 2,000 rpm with a high-speed stirrer at room temperature for 1 minute to form an emulsion. The emulsion was heated at 60° C. for 7 hours, at 80° C. for 2 hours and further at 90° C. for 1 hour to polymerize the contained polymerizable monomers, and the resultant emulsion ① was cooled to room temperature. Further, 200 parts of the above aqueous phase and 80 parts of the above oil phase ② were placed in a separable flask, and the mixture was stirred at 2,000 rpm with a high-speed stirrer at room temperature for 2 minutes to form an emulsion. The so-obtained emulsion was heated at 90° C. for 3 hours to polymerize the contained polymerizable monomers, and the resultant emulsion ② was cooled to room temperature. Then, the emulsion ① and the emulsion ② were mixed, salted out and dried to give a styrene/acrylate copolymer resin.

SYNTHESIS EXAMPLE 7

(Suspension/Emulsion Polymerization)

(Preparation of oil phase ①)

70 Parts of styrene and 30 parts of n-butyl acrylate were mixed.

(Preparation of aqueous phase ①)

0.4 Part of potassium persulfate and 0.4 part of sodium dodecylsulfate were added to 200 parts of deionized water, and the mixture was sitrred to obtain an aqueous phase.

(Preparation of oil phase ②)

6 Parts of a Fischer-Tropsch wax formed from natural gas (trade name: FT-100, melting point 91° C., supplied by Shell MDS (Malaysia) Sdn. Bhd.) was dissolved in a hot mixture of 80 parts of styrene and 14 parts of n-butyl acrylate, and the mixture was cooled to room temperature. 5 Parts of benzoyl peroxide (polymerization initiator) was mixed with the above mixture.

(Preparation of aqueous phase ②)

0.04 Part of sodium dodecylsulfonate was added to a mixture of 200 parts of deionized water and 10 parts of calcium tertiary phosphate, and the resultant mixture was stirred to obtain an aqueous phase.

200 Parts of the above aqueous phase ① and 20 parts of the above oil phase ① were placed in a separable flask, and the mixture was stirred at 2,000 rpm with a high-speed stirrer at room temperature for 2 minutes to form an emulsion. The emulsion was heated at 60° C. for 7 hours, at 80° C. for 2 hours and further at 90° C. for 1 hour to polymerize the contained polymerizable monomers, and the resultant emulsion was cooled to room temperature, salted out and dried to give a styrene/acrylate copolymer ①. Further, 80 parts of the above oil phase ② was added to 200 parts of the above aqueous phase ② and, and the mixture was stirred at 1,000 rpm with a high-speed stirrer for 1 minute to form a suspension. The so-obtained suspension was heated at 90° C. for 3 hours to polymerize the contained polymerizable monomers, and the resultant suspension was cooled to room temperature. Polymer particles were recovered by filtration, washed and dried to give a styrene/acrylate copolymer ②. Then, the styrene/acrylate copolymer ① and the styrene/acrylate copolymer ② were mixed, to give a styrene/acrylate copolymer resin.

SYNTHESIS EXAMPLE 8

(Suspension/Solution Polymerization)

(Preparation of oil phase)

0.5 Part of 2,2'-azobis-(2,4-dimethylvaleronitirle) (polymerization initiator) was mixed with a mixture of 72 parts of styrene and 28 parts of n-butyl acrylate.

(Preparation of aqueous phase)

0.04 Part of sodium dodecylsulfonate was added to a mixture of 200 parts of deionized water and 10 parts of calcium tertiary phosphate, and the resultant mixture was stirred to obtain an aqueous phase.

The above oil phase and the above aqueous phase were placed in a separable flask, and the mixture was stirred at 1,000 rpm with a high-speed stirrer at room temperature for 1 minute to form a suspension. The suspension was heated at 60° C. for 7 hours, at 80° C. for 2 hours and further at 90° C. for 1 hour to polymerize the contained polymerizable monomers. Then, the resultant suspension was cooled to room temperature, and polymer particles were recovered by filtration and dried to obtain a first vinyl-containing copolymer.

20 Parts of the first copolymer, 6 parts of a Fischer-Tropsch wax formed from natural gas (trade name: FT-100, supplied by Shell MDS (Malaysia) Sdn. Bhd.) and 100 parts of xylene were placed in a flask and dissolved. The inner atmosphere of the flask was replaced with nitrogen gas, and the mixture was heated up to the boiling point of xylene. While the mixture was stirred under the reflux of xylene, a mixture containing 77 parts of styrene, 3 parts of methyl methacrylate, 14 parts of n-butyl acrylate and 3.5 parts of benzoyl peroxide (polymerization initiator) were dropwise added over 2 hours to carry out a solution polymerization. After the addition was completed, the reaction mixture was aged for 1 hour with stirring under the reflux of xylene, to give a styrene/methyl methacrylate/n-butyl acrylate (to be sometimes referred to as styrene/MMA/BA hereinafter) copolymer.

SYNTHESIS EXAMPLE 9

(Emulsion/Solution Polymerization)

(Preparation of oil phase)

72 Parts of styrene and 28 parts of n-butyl acrylate were mixed.

(Preparation of aqueous phase)

200 Parts of deionized water, 0.4 part of potassium persulfate and 0.4 part of sodium dodecylsulfonate were mixed to obtain an aqueous.

The above oil phase and the above aqueous phase were placed in a separable flask, and the mixture was stirred at 2,000 rpm with a high-speed stirrer at room temperature for 2 minutes to form an emulsion. The emulsion was heated at 60° C. for 7 hours, at 80° C. for 2 hours and further at 90° C. for 1 hour to polymerize the polymerizable monomers. Then, the resultant emulsion was cooled to room temperature, salted out and dried to obtain a first vinyl-containing copolymer.

20 Parts of the first copolymer, 6 parts of a Fischer-Tropsch wax formed from natural gas (trade name: FT-100, supplied by Shell MDS (Malaysia) Sdn. Bhd.) and 100 parts of xylene were placed in a flask and dissolved. The inner atmosphere of the flask was replaced with nitrogen gas, and the mixture was heated up to the boiling point of xylene. While the mixture was stirred under the reflux of xylene, a mixture containing 77 parts of styrene, 3 parts of methyl methacrylate, 14 parts of n-butyl acrylate and 3.5 parts of benzoyl peroxide (polymerization initiator) were dropwise added over 2 hours to carry out a solution polymerization. After the addition was completed, the reaction mixture was aged for 1 hour with stirring under the reflux of xylene, to give a styrene/MMA/BA copolymer.

SYNTHESIS EXAMPLE 10

(Suspension/Solution Polymerization)

(Preparation of oil phase)

0.5 Part of 2,2'-azobis-(2,4-dimethylvaleronitirle) (polymerization initiator) was mixed with a mixture of 72 parts of styrene and 28 parts of n-butyl acrylate, to obtain an oil phase.

(Preparation of aqueous phase)

0.04 Part of sodium dodecylsulfonate was added to a mixture of 200 parts of deionized water and 10 parts of calcium tertiary phosphate, and the resultant mixture was stirred to obtain an aqueous phase.

The above oil phase and the above aqueous phase were placed in a separable flask, and the mixture was stirred at 1,000 rpm with a high-speed stirrer at room temperature for 1 minute to form a suspension. The suspension was heated at 60° C. for 7 hours, at 80° C. for 2 hours and further at 90° C. for 1 hour to polymerize the contained polymerizable monomers. Then, the resultant suspension was cooled to room temperature, and polymer particles were recovered by filtration and dried to obtain a first vinyl-containing copolymer.

20 Parts of the first copolymer, 6 parts of a Fischer-Tropsch wax formed from coal (trade name: C-10$^5$, supplied by SASOL, South African Coal Oil & Gas Corp., Ltd.) and 100 parts of xylene were placed in a flask and dissolved. The inner atmosphere of the flask was replaced with nitrogen gas, and the mixture was heated up to the boiling point of xylene. While the mixture was stirred under the reflux of xylene, a mixture containing 77 parts of styrene, 3 parts of methyl methacrylate, 14 parts of n-butyl acrylate and 3.5 parts of benzoyl peroxide (polymerization initiator) were dropwise added over 2 hours to carry out a solution polymerization. After the addition was completed, the reaction mixture was aged for 1 hour with stirring under the reflux of xylene, to give a styrene/MMA/BA copolymer.

EXAMPLE 16

| | |
|---|---|
| Styrene/acrylate copolymer resin obtained in Synthesis Example 5 | 100 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |

The above raw materials were mixed with a super mixer and melt-kneaded under heat with a twin-screw kneader. The kneaded mixture was pulverized with a jet mill and classified with a dry air-current classifier to give particles having an average particle diameter of 10 μm. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

EXAMPLE 17

| | |
|---|---|
| Styrene/acrylate copolymer resin obtained in Synthesis Example 6 | 100 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |

Particles having an average particle diameter of 10 μm were obtained from the above raw materials in the same manner as in Example 16. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

SYNTHESIS EXAMPLE 18

| | |
|---|---|
| Styrene/acrylate copolymer resin obtained in Synthesis Example 7 | 100 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |

Particles having an average particle diameter of 10 μm were obtained from the above raw materials in the same manner as in Example 16. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

SYNTHESIS EXAMPLE 19

| | |
|---|---|
| Styrene/MMA/BA copolymer resin obtained in Synthesis Example 8 | 100 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |

Particles having an average particle diameter of 10 μm were obtained from the above raw materials in the same manner as in Example 16. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

SYNTHESIS EXAMPLE 20

| | |
|---|---|
| Styrene/MMA/BA copolymer resin obtained in Synthesis Example 9 | 100 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |

Particles having an average particle diameter of 10 μm were obtained from the above raw materials in the same manner as in Example 16. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

SYNTHESIS EXAMPLE 21

| | |
|---|---|
| Styrene/MMA/BA copolymer resin obtained in Synthesis Example 10 | 100 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |

Particles having an average particle diameter of 10 μm were obtained from the above raw materials in the same manner as in Example 16. 100 Parts of the particles and 0.3 part of hydrophobic silica (trade name: Cab-O-Sil TS-530, supplied by Cabot Corp.) were stirred in a Henschel mixer for 1 minute to give an electrophotographic toner having a surface to which hydrophobic silica adhered.

SYNTHESIS EXAMPLE 11

A styrene/acrylate copolymer was obtained in the same manner as in Synthesis Example 5 except that no Fischer-Tropsch wax formed from natural gas was added.

COMPARATIVE EXAMPLE 13

| | |
|---|---|
| Styrene/acrylate copolymer resin obtained in Synthesis Example 11 | 94 parts |
| Chromium-containing metal dye (trade name: Bontron S-34, supplied by Orient Chemicals Industries, Ltd.) | 1.5 parts |
| Carbon black (trade name: MA-100, supplied by Mitsubishi Chemical Co., Ltd.) | 7.5 parts |
| Fischer-Tropsch wax formed from natural gas (trade name: FT-100, melting point 91° C., supplied by Shell-MDS) | 6 parts |

A comparative electrophotographic toner was obtained from the above raw materials in the same manner as in Example 16 except that the styrene/acrylate copolymer resin was replaced with the copolymer resin obtained in Synthesis Example 11 and that the Fischer-Tropsch wax formed from natural gas was added.

COMPARATIVE EXAMPLE 14

A comparative electrophotographic toner was obtained in the same manner as in Comparative Example 14 except that the Fischer-Tropsch wax formed from natural gas was replaced with a polypropylene wax (trade name: Viscol 550P, melting point 145° C., supplied by Sanyo Chemical Industries, Ltd.).

TABLE 7

| | Offsetting-free temperature range (°C.) | Offsetting-free temperature width (°C.) | Fixing strength (%) | Flow-ability (g/cm³) | Shelf life |
|---|---|---|---|---|---|
| Ex. 16 | 125–200 | 75 | 83 | 0.36 | A |
| Ex. 17 | 120–200 | 80 | 80 | 0.36 | A |
| Ex. 18 | 120–200 | 80 | 82 | 0.36 | A |
| Ex. 19 | 120–200 | 80 | 81 | 0.36 | A |
| Ex. 20 | 120–200 | 80 | 82 | 0.36 | A |
| Ex. 21 | 125–200 | 80 | 80 | 0.36 | A |
| CEx. 13 | 130–190 | 65 | 78 | 0.34 | A |
| CEx. 14 | 120–200 | 70 | 55 | 0.36 | A |

TABLE 7-continued

| | Offsetting-free temperature range (°C.) | Offsetting-free temperature width (°C.) | Fixing strength (%) | Flow-ability (g/cm³) | Shelf life |
|---|---|---|---|---|---|

Ex. = Example,
CEx. = Comparative Example

Table 7 shows that the electrophotographic toners according to the present invention caused no offsetting in the broad offsetting-free temperature range from low temperature to high temperature and that the temperature width was 75° C.–80° C. or sufficient for practical use. The toners according to the present invention showed a fixing strength sufficient for practical use, as high as at least 80% at 130° C., so that they are acceptable for use with an automatic document feeder.

In contrast, the toner obtained in Comparative Example 13 showed low offsetting-free temperature on the high temperature side, and the toner obtained in Comparative Example 14 showed high offsetting-free temperature on the low temperature side. That is, the offsetting-free temperature width of these toners was 65° to 70° C. Further, the toner obtained in Comparative Example 14 showed a low fixing strength, as low as 60% or less, at a fixing temperature of 130° C., and the toner obtained in Comparative Example 13 had a low apparent density or poor flowability since the dispersibility of the wax in the toner was poor.

The developers containing the toners obtained in Examples 16 to 21 were used for continuously making up to 5,000 copies with a commercially available copying machine (trade name: BD-3810, supplied by Toshiba Corp.). Table 8 shows the results.

TABLE 8

| | Image density | | Fogging | | Tribocharge | |
|---|---|---|---|---|---|---|
| | Initial | 5,000th | Initial | 5,000th | Initial | 5,000th |
| Ex. 16 | 1.42 | 1.39 | 0.48 | 0.59 | −24.4 | −26.2 |
| Ex. 17 | 1.40 | 1.42 | 0.40 | 0.49 | −25.2 | −26.0 |
| Ex. 18 | 1.42 | 1.41 | 0.45 | 0.60 | −24.2 | −25.6 |
| Ex. 19 | 1.42 | 1.41 | 0.38 | 0.48 | −24.0 | −24.8 |
| Ex. 20 | 1.42 | 1.41 | 0.42 | 0.55 | −24.2 | −24.9 |
| Ex. 21 | 1.42 | 1.41 | 0.45 | 0.56 | −24.4 | −25.2 |

Ex. = Example

In all the Examples 16 to 21, the tribocharge was maintained at a value of −24 μc/g to −27 μc/g from a first copy to a 5,000th copy. The image density was maintained at a value of 1.42 to 1.39 from a first copy to a 5,000th copy, which shows that the toners obtained in Examples 16 to 21 are acceptable in practical use. Further, it was also found that all the toners obtained in Examples 16 to 21 were acceptable concerning fogging of non-image portion or showed 0.60 or less.

What is claimed is:

1. An electrophotographic toner containing a binder resin and a colorant as main components, the toner further containing a Fischer-Tropsch wax formed from natural gas and having a melting point, measured with a differential scanning calorimeter, of 85° to 100° C.

2. An electrophotographic toner according to claim 1, wherein the Fischer-Tropsch wax formed from natural gas has a penetration rate of 2 or less at 25° C.

3. An electrophotographic toner according to claim 1, wherein the electrophotographic toner contains 1 to 20% by weight, based on the total weight thereof, of the Fischer-Tropsch wax formed from natural gas.

4. An electrophotographic toner containing a binder resin and a colorant as main components, the toner further containing a Fischer-Tropsch wax formed from natural gas and having a melt viscosity, measured at 110° C., of $1 \times 10^5$ to $1 \times 10^6$ poise.

5. An electrophotographic toner according to claim 4, wherein the Fischer-Tropsch wax formed from natural gas has a melting point, measured with a differential scanning calorimeter, of 85° to 100° C.

6. An electrophotographic toner according to claim 4, wherein the Fischer-Tropsch wax formed from natural gas has a penetration rate of 2 or less at 25° C.

7. An electrophotographic toner containing a binder resin and a colorant as main components, the toner containing a Fischer-Tropsch wax formed from natural gas, the binder resin being a styrene/(meth)acrylate copolymer, the toner showing two maximal values when measured by GPC, one maximal value being at least $8 \times 10^5$, the other being in the range of from 3,000 to 10,000.

8. An electrophotographic toner according to claim 7, wherein the Fischer-Tropsch wax formed from natural gas has a melting point, measured with a differential scanning calorimeter, of 85° to 100° C.

9. An electrophotographic toner according to claim 7, wherein the Fischer-Tropsch wax formed from natural gas have a penetration rate of 2 or less at 25° C.

10. An electrophotographic toner according to claim 7, wherein the electrophotographic toner contains 20% by weight or less, based on the electrophotographic toner, of the styrene/(meth)acrylate copolymer having a molecular weight maximal value of at least $8 \times 10^5$.

11. An electrophotographic toner containing a binder resin and a colorant as main components, the binder resin containing a vinyl-containing copolymer formed by polymerization in the presence of a Fischer-Tropsch wax formed from natural gas.

* * * * *